United States Patent
Konstantakopoulos et al.

(10) Patent No.: US 7,017,339 B2
(45) Date of Patent: Mar. 28, 2006

(54) EXHAUST SYSTEM CATALYST ASSEMBLY FOR A DUAL CRANKSHAFT ENGINE

(75) Inventors: George Konstantakopoulos, Birmingham, MI (US); Donald D Anderson, Ann Arbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 47 days.

(21) Appl. No.: 10/799,911

(22) Filed: Mar. 12, 2004

(65) Prior Publication Data
US 2005/0198947 A1    Sep. 15, 2005

(51) Int. Cl.
*F01N 7/10*    (2006.01)
(52) U.S. Cl. .......................... 60/323; 60/299; 60/305; 60/312; 60/322; 123/DIG. 8; 123/59.6
(58) Field of Classification Search .............. 60/299, 60/302, 305, 312, 313, 322, 323; 123/DIG. 8, 123/59.6
See application file for complete search history.

(56) References Cited

U.S. PATENT DOCUMENTS

| | | | |
|---|---|---|---|
| 3,779,013 A * | 12/1973 | Faber et al. | 60/278 |
| 4,531,379 A * | 7/1985 | Diefenthaler, Jr. | 62/236 |
| 5,265,420 A * | 11/1993 | Rutschmann | 60/302 |
| 5,775,100 A * | 7/1998 | Sloss et al. | 60/299 |
| 5,956,949 A * | 9/1999 | Mayer et al. | 60/301 |
| 5,964,088 A * | 10/1999 | Kinugasa et al. | 60/286 |
| 6,374,600 B1 * | 4/2002 | Uegane et al. | 60/322 |
| 6,907,726 B1 * | 6/2005 | Kim | 60/323 |

* cited by examiner

*Primary Examiner*—Binh Q. Tran
(74) *Attorney, Agent, or Firm*—Thomas A. Jurecko

(57) ABSTRACT

An exhaust system for a dual crankshaft engine system having a first engine and a second engine having a common exhaust member open at an end thereof for venting engine exhaust. A first exhaust member is adapted to be coupled to the first engine and coupled to the common exhaust member. The first exhaust member has a first catalytic converter formed thereon. A second exhaust member is adapted to be coupled to the first engine and coupled to the common exhaust member and has a second catalytic converter formed thereon. A third exhaust member is adapted to be coupled to the second engine and coupled to the common exhaust member. A fourth exhaust member is adapted to be coupled to the second exhaust engine and coupled to the common exhaust member. A third catalytic converter is provided in the exhaust member.

5 Claims, 2 Drawing Sheets

US 7,017,339 B2

EXHAUST SYSTEM CATALYST ASSEMBLY FOR A DUAL CRANKSHAFT ENGINE

FIELD OF THE INVENTION

The present invention relates to an exhaust system for a dual crankshaft engine, and more particularly to an exhaust system catalyst assembly for a dual crankshaft engine in parallel or series.

BACKGROUND OF THE INVENTION

Internal combustion engines have been used for many years for providing motive power for driving a vehicle. Most vehicles on the road today are provided with either a four, six, or eight cylinder engine which is selected based upon the typical torque demand requirements for the individual type vehicle being designed. For example, four cylinder engines are typically used for commuter vehicles which are compact and typically have low load requirements and limited performance expectations. Six cylinder and eight cylinder engines are typically employed in larger vehicles wherein larger load carrying capacity and higher performance are expected. Some of the existing vehicle designs have suffered from low fuel efficiency due to the fact that the internal combustion engine for the vehicle has to be designed with a sufficient capacity to meet the high torque demands that are only occasionally required.

Dual crankshaft engines overcome these deficiencies by providing a power train system that includes a dual crankshaft engine system with one of the engine portions being independently operable for providing driving torque to a transmission while the second engine portion can be utilized to supplement the driving torque of the first engine portion to meet higher torque demand requirements. These engine portions may be on one engine block or as separate engines. Operation of the dual crankshaft engine system is provided such that during normal driving at constant speeds and typical driving loads, the first engine portion is utilized for providing driving torque to the wheels of the vehicle. During periods of operation where increased levels of torque are required, such as during acceleration, pulling a heavy load, or climbing a hill, the second engine portion is operated in conjunction with the first engine portion for meeting the higher torque demand requirements.

A typical exhaust system for a single engine has a catalytic converter mounted along an exhaust pipe for cleaning the exhaust gases from the engine portion. Typically, catalytic converters operate efficiently at elevated temperatures. However, for a dual crankshaft engine system, since only one engine portion is operating in most driving circumstances, it can be difficult to keep a catalytic converter for the non-operating engine portion at an elevated temperature where it is most effective. Moreover, each catalytic converter must be sized according to which engine portions are in use with a given catalytic converter.

SUMMARY OF THE INVENTION

An exhaust system is provided for a dual crankshaft engine system having a first engine and a second engine. The exhaust system includes an exhaust member open at an end thereof for venting engine exhaust. A first member is coupled to the first engine and coupled to the exhaust member. The first member has a catalytic converter therein. A second member is coupled to the second engine and coupled to the exhaust member. A second catalytic converter is provided in the exhaust member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
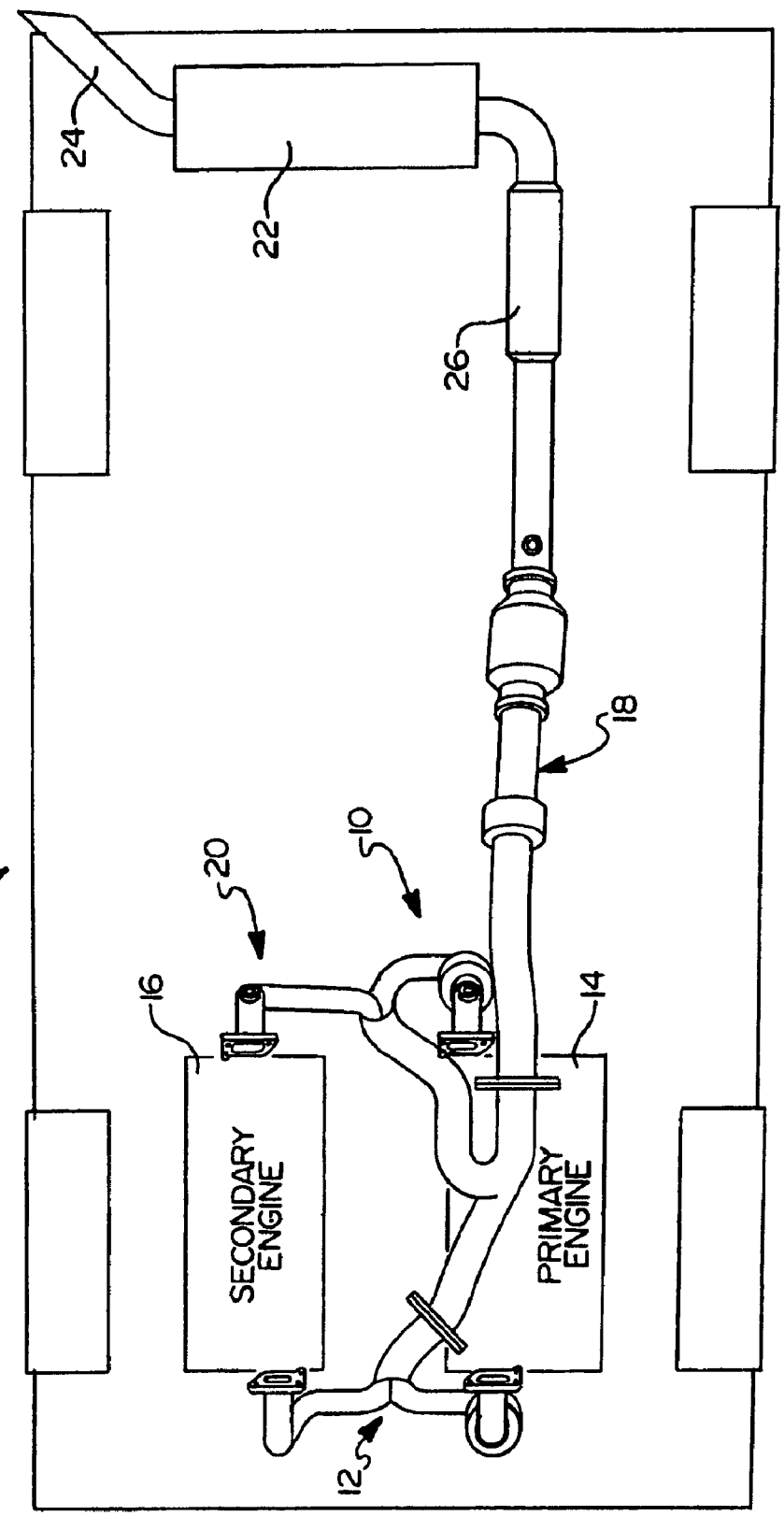
FIG. 1 is a schematic illustration of a motor vehicle incorporating an exhaust system constructed according to the principles of the present invention.

With reference to FIG. 1, an exhaust system 10 constructed according to the principles of the present invention is illustrated in operative association with an exemplary motor vehicle 8. The motor vehicle 8 includes a dual crankshaft engine 12 having a primary engine 14 and a secondary engine 16. It should be appreciated that the primary engine 14 and the secondary engine 16 may be part of a single engine block having dual crankshafts, or have two separate engine blocks. The dual displacement engine 12 is coupled to a transmission (not shown) that in turn drives the motor vehicle 8. The primary engine 14 and secondary engine 16 are combustion displacement engines that emit an exhaust gas when firing. This exhaust gas is typically hot due to the combustion of fuel within the engines 14, 16 and is laden with undesirable emissions. These emissions should be removed from the exhaust gas prior to dispersement in the environment outside the motor vehicle 8.

The exhaust system 10 includes an exhaust member 18 mounted generally underneath the motor vehicle 8 extending from the primary engine 14 and the secondary engine 16 to a rear portion of the motor vehicle 8. The exhaust member 18 is coupled to the primary engine 14 and the secondary engine 16 via a connection portion 20, as will be described in greater detail below. A muffler 22 is mounted to an end of the exhaust member 18 opposite that of the connection portion 20. The muffler 22 is preferably a conventional muffler as is known in the art and is used to dampen sound vibrations from the exhaust gases. A tailpipe 24 extends out from the muffler 22 for venting the exhaust gases into the atmosphere. Generally speaking, exhaust gases from the primary engine 14 and the secondary engine 16 are passed through the connection portion 20, through the exhaust member 18, through the muffler 22, and out through the tailpipe 24 downstream of the connection portion 20.

A resonator 26 is optionally mounted upstream of the muffler 22 on the exhaust member 18. The resonator 26 is used to modify sound coming from the exhaust by canceling out a certain sound frequency. Alternatively, the resonator 26 may be included in the muffler 22 as a resonator chamber.

Figure 2:
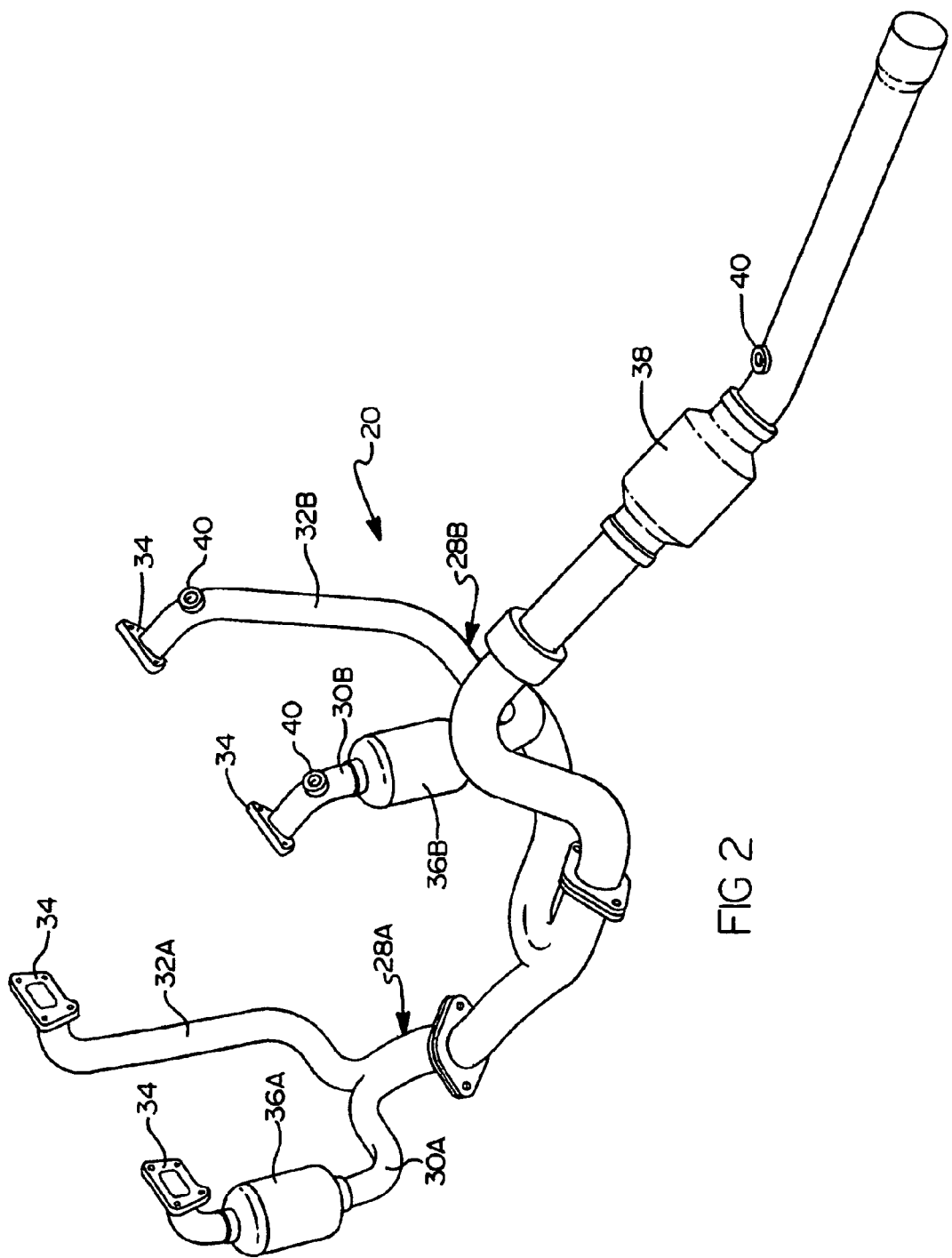
FIG. 2 is a perspective view of the exhaust system according to the principles of the present invention.

Turning now to FIG. 2, the connector portion 20 includes a first member 28A and a second member 28B. The first member 28A and the second member 28B are generally tubular in shape and are each mounted at an end thereof to the exhaust member 18. Both the first and second members 28A, 28B have a Y-shaped configuration with a primary branch 30A, 30B, respectively, and a secondary branch 32A, 32B, respectively. A mounting flange 34 is formed at an open end of each of the primary branches 30A, 30B and secondary branches 32A, 32B. The mounting flanges 34 are each adapted to connect the first and second exhaust members 28A, 28B to the heads (not shown) of the primary engine 14 and the secondary engine 16 in order to receive exhaust gases therefrom. Specifically, the primary branches 30A, 30B are coupled to the primary engine 14 and the secondary branches 32A, 32B are coupled to the secondary engine 16.

The exhaust system 10 further includes a first primary catalytic converter 36A, a second primary catalytic converter 36B, and a toe board catalytic converter 38. The first primary catalytic converter 36A is mounted downstream of the mounting flange 34 on the first primary branch 30A. The second primary catalytic converter 36B is mounted downstream of the mounting flange 34 on the second primary branch 30B. The toe board catalytic converter 38 is mounted downstream of the connector portion 20 on the exhaust member 18 and upstream of the resonator 26. The catalytic converters 36A, 36B, 38 remove undesirable emissions from the exhaust in a manner well known in the art.

Furthermore, the exhaust system 10 includes a plurality of oxygen sensors 40 for sensing an oxygen level in the exhaust gas. An oxygen sensor 40 is mounted on the secondary branch 30B upstream of the second primary catalytic converter 36B, on the secondary branch 32B and on the exhaust member 18 directly downstream of the toe board catalytic converter 38.

In the case of the dual displacement engine 12 of the present invention, the primary engine 14 operates continuously while the secondary engine 16 operates sporadically. Accordingly, exhaust gas from the primary engine 14 moves through the first and second primary branches 30A, 30B and through the first and second primary catalytic converters 36A, 36B before passing downstream into the toe board catalytic converter 38, through the exhaust member 18, through the resonator 26, through the muffler 22, and out through the tailpipe 24. The first and second primary catalytic converters 36A, 36B operate to remove most of the undesirable emissions from the exhaust gas, while the warm exhaust gases keep the toe board catalytic converter 38 in a "warm" (e.g., at an elevated temperature) operating condition. When the secondary engine 16 is fired, exhaust gases flow from the first and secondary branches 32A, 32B and directly into the toe board catalytic converter 38 before moving downstream through the exhaust system 10 and out the tailpipe 24. By keeping the toe board catalytic converter 38 "warm" using the exhaust gas from the primary engine 14, the toe board catalytic converter 38 will operate more efficiently to remove undesirable emissions from the exhaust gas of the secondary engine 16. The oxygen sensors 40 sense the oxygen content of the exhaust gases in order to assure that the exhaust gases meet environmental quality standards.

The connector portion 20 and exhaust member 18 are shaped to conform to the specific dimensions of the primary engine 14 and the secondary engine 16, as well as the dimensions of the motor vehicle 8. Accordingly, variously shaped and sized members may be used in the exhaust system 10 of the present invention without departing from the scope of the present invention. Moreover, each catalytic converter 36A, 36B, and 38 is sized to accommodate the flow of gasses during use. Specifically, the first and second primary catalytic converters 36A, 36B are sized to accommodate only the primary engine 14 exhaust while the toe board catalytic converter 38 is sized to accommodate both the primary and secondary engines' 14, 16 exhaust.

The description of the invention is merely exemplary in nature and, thus, variations that do not depart from the gist of the invention are intended to be within the scope of the invention. For example, although the preferred embodiment is illustrated with a piston engine, it should be understood that a rotary engine could also be utilized. Such variations are not to be regarded as a departure from the spirit and scope of the invention.

What is claimed is:

1. An exhaust system for a first and second engine comprising:
    a common exhaust member open at an end thereof for venting engine exhaust;
    a first exhaust member adapted to be coupled to the first engine and coupled to said common exhaust member, said first exhaust member having a first catalytic converter therein;
    a second exhaust member adapted to be coupled to the second engine and coupled to said common exhaust member;
    a second catalytic converter formed in said common exhaust member;
    a third exhaust member adapted to be coupled to the first engine and coupled to said common exhaust member, said third exhaust member having a third catalytic converter therein; and
    a fourth exhaust member adapted to be coupled to the second engine and coupled to said common exhaust member.

2. The exhaust system of claim 1, further comprising at least three oxygen sensors, a first oxygen sensor located on said first exhaust member, a second oxygen sensor located on said second exhaust member, and a third oxygen sensor located on said common exhaust member.

3. A motor vehicle comprising:
    a first engine portion;
    a second engine portion;
    an exhaust system comprising:
        a common exhaust member open at an end thereof for venting engine exhaust;
        a first exhaust member adapted to be coupled to said first engine portion and coupled to said common exhaust member, said first exhaust member having a first catalytic converter therein;
        a second exhaust member adapted to be coupled to said second engine portion and coupled to said common exhaust member;
        a second catalytic converter formed in said common exhaust member;
        a third exhaust member adapted to be coupled to the first engine portion and coupled to said common exhaust member, said third exhaust member having a third catalytic converter therein; and
        a fourth exhaust member adapted to be coupled to the second engine portion and coupled to said common exhaust member.

4. The motor vehicle of claim 3, further comprising at least three oxygen sensors, a first oxygen sensor located on said first exhaust member, a second oxygen sensor located on said second exhaust member, and a third oxygen sensor located on said common exhaust member.

5. The motor vehicle of claim 3, wherein said first and second engine portions are part of a single engine block.

* * * * *